(12) United States Patent
Koo et al.

(10) Patent No.: US 7,246,042 B2
(45) Date of Patent: Jul. 17, 2007

(54) APPARATUS AND METHOD FOR ENHANCING ACCURACY OF SENSOR SIGNAL

(75) Inventors: Ji-hun Koo, Yongin-si (KR); Seong-il Cho, Seoul (KR); Sang-goog Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/826,300

(22) Filed: Apr. 19, 2004

(65) Prior Publication Data
US 2004/0210411 A1    Oct. 21, 2004

(30) Foreign Application Priority Data
Apr. 17, 2003    (KR) ...................... 10-2003-0024330

(51) Int. Cl.
*G06F 15/00*    (2006.01)
*G01D 18/00*    (2006.01)

(52) U.S. Cl. ...................... 702/190; 702/104

(58) Field of Classification Search .................. 702/85, 702/91, 104, 106, 107, 116, 124, 189, 190, 702/191, 193, 194, 195; 704/220, 226; 455/20, 455/23, 24, 114.2, 127.1
See application file for complete search history.

(56) References Cited

U.S. PATENT DOCUMENTS

| | | | | |
|---|---|---|---|---|
| 4,000,369 A | * | 12/1976 | Paul et al. | .................. 704/228 |
| 5,825,350 A | * | 10/1998 | Case et al. | .................. 345/163 |
| 6,546,361 B2 | * | 4/2003 | Di Tommaso et al. | ...... 702/189 |

* cited by examiner

*Primary Examiner*—Bryan Bui
(74) *Attorney, Agent, or Firm*—Sughrue Mion, PLLC

(57) ABSTRACT

An apparatus and method for enhancing the accuracy of a sensor signal are provided. The apparatus includes: a low-pass filter (LPF) that filters the sensor signal and outputs a low-frequency sensor signal; an operation determination unit that determines whether the sensor is not in operation; a bias estimating unit that estimates bias included in the low frequency sensor signal output from the LPF according to the output of the determination unit; and a subtractor that subtracts the estimated bias from the low frequency sensor signal according to the output of the operation determination unit.

19 Claims, 5 Drawing Sheets

APPARATUS AND METHOD FOR ENHANCING ACCURACY OF SENSOR SIGNAL

BACKGROUND OF THE INVENTION

This application claims priority from Korean Patent Application No. 2003-24330, filed on Apr. 17, 2003, in the Korean Intellectual Property Office, the disclosure of which is incorporated herein in its entirety by reference.

1. Field of the Invention

The present invention relates to an apparatus and method for enhancing the accuracy of a sensor signal, and more particularly, to an apparatus and method for enhancing the accuracy of a sensor signal by compensating for bias and controlling tolerance of the sensor.

2. Description of the Related Art

Generally, a sensor signal exhibits drift with respect to time. Also, there is an offset, which needs to be compensated for, in a measured value through a sensor due to an inner bias or an outer bias such as noise. In addition to compensating for bias, tolerance may also need to be considered. Since a bias or a tolerance cannot be obtained through the sensor, sensor error may be corrected after finding the cause, or through an error estimating algorithm, to increase the accuracy of values measured by the sensor.

FIG. 1 is a block diagram of a bias compensating apparatus disclosed in U.S. Pat. No. 5,825,350. In the bias compensating apparatus of FIG. 1, a low-pass filter (LPF) 10 extracts a low-frequency signal from a sensor signal, and a differentiator 11 differentiates the low-frequency signal. A window comparator 12 determines whether or not the differentiated signal is included within a window of a predetermined size. A latch 13 stores a signal output from the LPF 10, and outputs the stored signal, in response to a signal output from the window comparator 12. A subtractor 14 subtracts the signal output from the latch 13 from the signal output from LPF 10 to output a final bias. According to a conventional apparatus for controlling a tolerance of a sensor, a sensor signal is determined to be the one when the sensor signal is greater than a predetermined reference value. However, since this bias compensating apparatus uses a single large-sized window comparator, a bias may not be compensated for, even when the sensor is not in operation.

Since a conventional apparatus for controlling tolerance has a fixed dead zone, namely a tolerance range, a predetermined part of a sensor signal is regarded as a noise which causes signal loss. As a result, it is increasingly likely that the sensor will not operate correctly.

SUMMARY OF THE INVENTION

The present invention provides an apparatus and method for compensating for bias and controlling tolerance level, in order to enhance accuracy of a sensor signal.

Consistent with an aspect of the present invention, there is provided an apparatus for enhancing the accuracy of a sensor signal output from a sensor by estimating and compensating for bias in the sensor signal. The apparatus includes a low-pass filter (LPF) that filters the sensor signal and outputs a low-frequency sensor signal; an operation determination unit that determines whether the sensor is not in operation; a bias estimating unit that estimates a bias included in the low frequency sensor signal output from the LPF according to the output of the determination unit; and a subtractor that subtracts the estimated bias from the low frequency sensor signal according to the output of the operation determination unit.

According to another aspect of the present invention, there is provided an apparatus for enhancing accuracy of a sensor signal output from a sensor by controlling a tolerance level. The apparatus includes a low-pass filter (LPF) that filters the sensor signal and outputs a low-frequency sensor signal; a determination unit that determines whether the sensor is not in operation; a noise bias estimating unit that estimates bias caused by noise which is included in the low frequency sensor signal output from the low-pass filter, according to the output of the determination unit; a tolerance level estimating unit that detects a level of the low frequency sensor signal that is higher than the estimated bias, according to the output of the operation determination unit, and estimates a tolerance level based on the detected level and the estimated bias; and a signal discriminating unit that outputs the low frequency sensor signal when the low frequency signal exceeds the estimated tolerance level.

According to another aspect of the present invention, there is provided a method for enhancing the accuracy of a sensor signal output from a sensor by estimating and compensating for bias in the sensor signal. The method includes: (a) low-pass filtering the sensor signal and outputting a low frequency sensor signal; (b) determining whether or not the sensor is not in operation; (c) estimating the bias included in the low frequency sensor signal when it is determined in step (b) that the sensor is not operating; and (d) compensating for the bias by subtracting the estimated bias from the low frequency sensor signal.

According to yet another aspect of the present invention, there is provided a method for enhancing accuracy of a sensor signal output from a sensor by controlling tolerance level. The method includes: (a) low-pass filtering the sensor signal and outputting a low frequency sensor signal; (b) determining whether or not the sensor is not in operation; (c) estimating a bias due to noise included in the low frequency sensor signal when it is determined in step (b) that the sensor is not operating; (d) detecting a level of the low frequency sensor signal that is higher than the estimated noise bias, and estimating the tolerance level using the sensed level and the noise bias, when it is determined in step (b) that the sensor is not operating; and (e) outputting the low frequency sensor signal when the filtered sensor signal has a higher level than the tolerance level estimated in step (d).

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
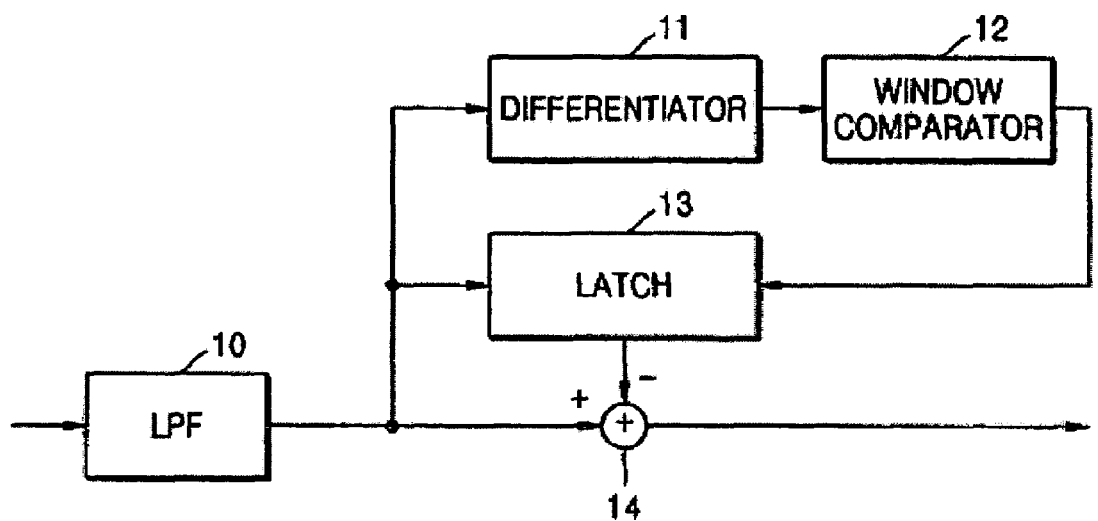
FIG. 1 is a block diagram of a conventional apparatus for compensating for bias in a sensor signal.
Figure 2:
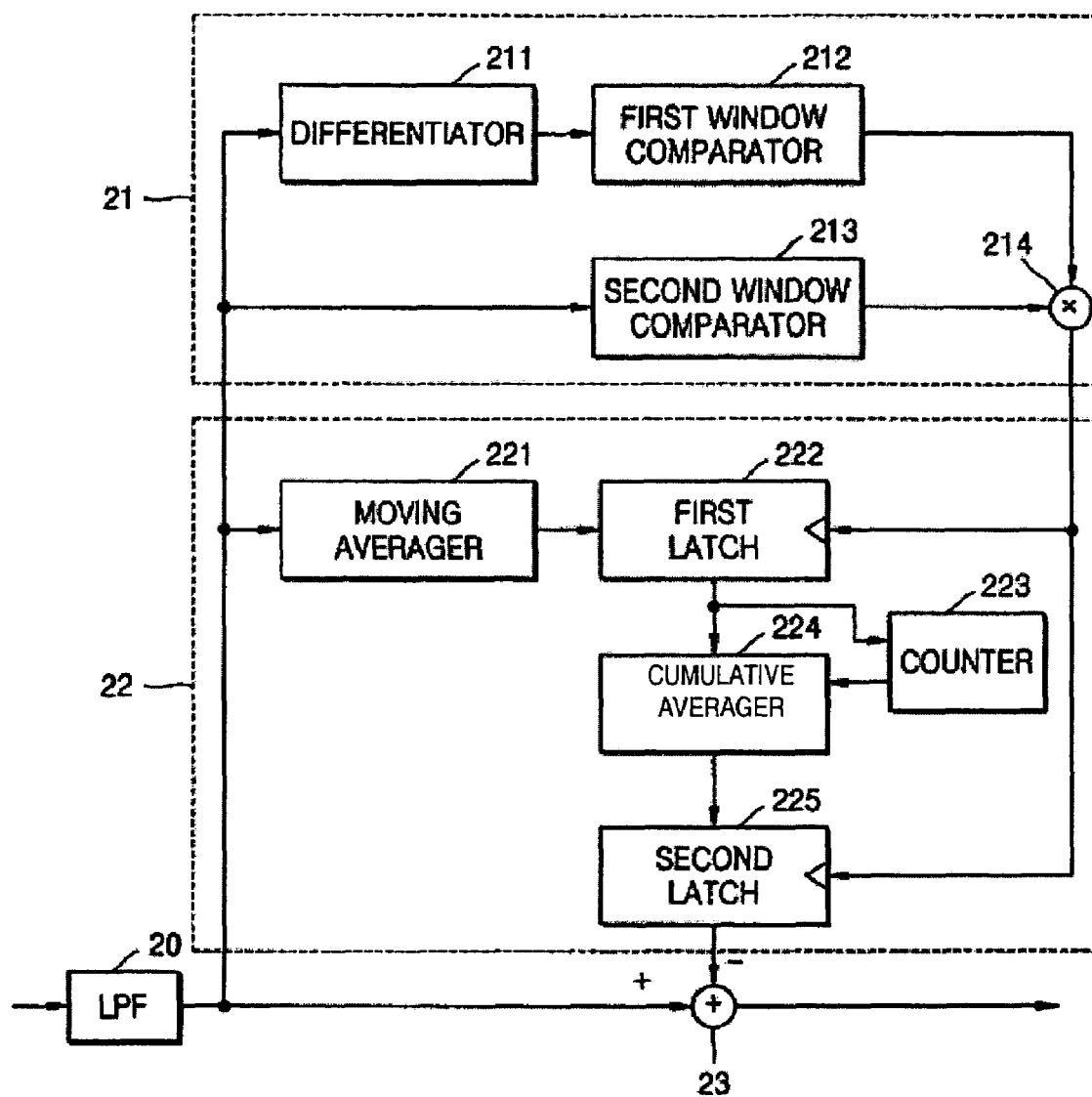
FIG. 2 is a block diagram of an apparatus for compensating for bias in a sensor signal according to the present invention.

FIG. 2 is a block diagram of an apparatus for compensating for bias in a sensor signal according to the present invention. Referring to FIG. 2, the apparatus comprises a low-pass filter (LPF) 20, a determination unit 21, a bias estimating unit 22 and a subtractor 23. The determination unit 21 includes a differentiator 211, a first window comparator 212, a second window comparator 213, and a multiplier 214. The bias estimating unit 22 includes a first moving averager 221, a first latch 222, a counter 223, a cumulative averager 224, and a second latch 225.

The LPF 20 low-pass filters the sensor signal and outputs its low-frequency component (hereinafter referred to as a low frequency sensor signal).

The determination unit 21 determines whether a sensor (not shown) is in operation or not. That is, the determination unit 21 determines whether or not bias compensation is required for the low frequency sensor signal currently being output from the LPF 20. In more detail, the first window comparator 212 determines whether or not a signal differentiated by the differentiator 211 is included in a window of a first size, and the second window comparator 213 determines whether or not the low frequency sensor signal is included in a window of a second size. Here, the first size and the second size can differ from each other and determined in consideration of the respective signals. The multiplier 214 multiplies the output of the first window comparator 212 by the output of the second window comparator 213. When the differentiated sensor signal is smaller than the first sized window and the low frequency sensor signal is smaller than the second sized window, it is determined that the sensor is not in operation and bias compensation for the current low frequency sensor signal is required.

The bias estimating unit 22 estimates the bias included in the low frequency sensor signal. The moving averager 221 moves a window having a predetermined length along a time axis for the low-frequency sensor signal and outputs an average of low-frequency signals included in the window. Here, the length of the window should be the same as that of the first window comparator 212 for the time axis. The first latch 222 stores the value output from the moving averager 221, and outputs the stored value when a signal of level 1 is output from the multiplier 214, that is, when it is determined that bias compensation for the filtered sensor signal is required. The cumulative averager 224 accumulates values output from the first latch 222, and calculates and outputs an average thereof. Here, the number of the accumulated values is limited by the counter 223, and may be, for example, between 10 and 20. The second latch 225 stores the value output from the cumulative averager 224, and outputs the stored value when a signal of level 1 is output from the multiplier 214. The value output by the second latch 225 is the estimated bias.

The subtractor 23 subtracts the value output from the second latch 225 from the low frequency sensor signal to output a bias-compensated sensor signal.

Figure 3:
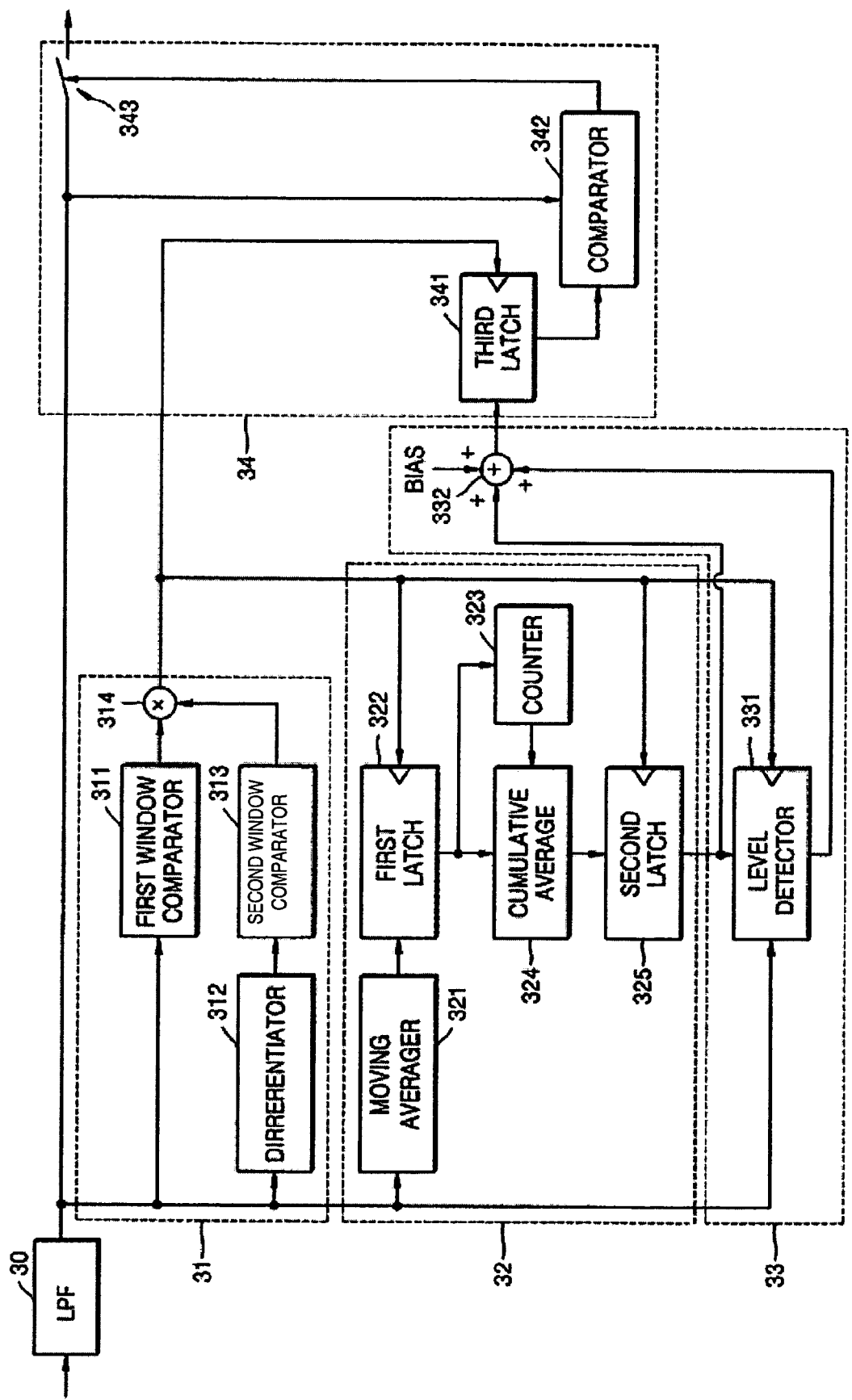
FIG. 3 is a block diagram of an apparatus for controlling tolerance level according to the present invention.

FIG. 3 is a block diagram of an apparatus for controlling a tolerance level of the sensor signal according to the present invention. Referring to FIG. 3, the apparatus comprises an LPF 30, an operation determination unit 31, a noise bias estimating unit 32, a tolerance level estimating unit 33, and a signal discriminating unit 34.

The determination unit 31 includes a first window comparator 311, a differentiator 312, a second window comparator 313, and a multiplier 314. The noise bias estimating unit 32 includes a moving averager 321, a first latch 322, a counter 323, a cumulative averager 324, and a second latch 325. The tolerance level estimating unit 33 includes a level sensor 331, and an adder 332. The signal discriminating unit 34 includes a third latch 341, a comparator 342, and a switch 343.

The LPF 30 low-pass filters a sensor signal and outputs a low frequency sensor signal.

The determination unit 31 determines whether or not a sensor (not shown) is in operation. In more detail, the first window comparator 311 determines whether the low frequency sensor signal is included in a first window of a first size. The differentiator 312 differentiates the low frequency sensor signal, and the second window comparator 313 decides whether the differentiated signal is included in a second window of a second size. Here, the first size and the second size can differ from each other and are determined in consideration of the respective signals. The multiplier 314 multiplies the output of the first window comparator 311 by the output of the second window comparator 313 to determine whether or not compensation for bias generated by noise is required in addition to compensation for bias inherent in the sensor, when the sensor is not operating.

The noise bias estimating unit 32 estimates sways of the bias due to noise. The moving averager 321 moves a window having a predetermined length along the time axis for the low frequency sensor signal and outputs an average of low-frequency sensor signals included in the window. Here, it is preferred that the length of the window is the same as that of the second window comparator 313 with respect to the time axis. The first latch 322 stores the value output from the moving averager 321 and outputs the stored value when a signal of level 1 is output from the multiplier 314. The cumulative averager 324 accumulates values output from the first latch 322, and calculates and outputs an average of the values. Here, the number of accumulated values is limited by the counter 323 and is smaller than that of the counter 223 in the apparatus for compensating for bias shown in FIG. 2. Here, the number of accumulated values is between about 4 and 10. The second latch 325 stores the value output from the cumulative averager 324, and outputs the stored value when a signal of level 1 is output from the multiplier 314. The value output from the second latch 325 is the estimated noise bias.

Figure 4:
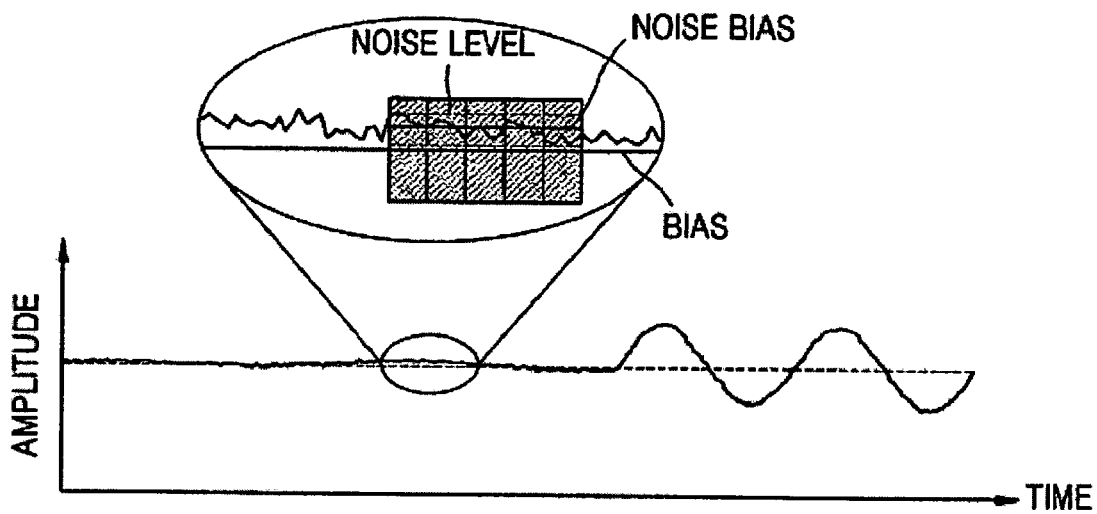
FIG. 4 is a graph of a sensor signal showing noise bias and noise level estimated by the apparatus of FIG. 3.

FIG. 4 is a graph of a low frequency sensor signal showing noise bias and noise level. The enlarged part of FIG. 4 shows the bias for the entire sensor signal, noise bias indicating sways of the bias due to a noise, and the noise level which has a width enough to cover the noise centred on the noise bias.

The tolerance level estimating unit 33 (FIG. 3) estimates the noise level from the low frequency sensor signal. The level detector 331 detects the low frequency sensor signal of a higher level than a reference level output from the second latch 325, when the signal of level 1 is output from the multiplier 314. The adder 332 adds up an externally given bias, the noise bias output from the second latch 325, and the value output from the level detector 331 to estimate a tolerance level.

The signal discriminating unit 34 compares the low frequency sensor signal to the tolerance level and determines whether or not to output the low frequency sensor signal.

The third latch 341 stores and outputs the tolerance level output from the adder 332 according to the output value of the multiplier 314. The comparator 342 compares the low frequency sensor signal to the tolerance level output from the third latch 341. If the low frequency sensor signal is larger than the tolerance level, the comparator 342 outputs a signal to make the switch 343 turn on, to pass the low frequency sensor signal through. Otherwise, the low frequency sensor signal is regarded as noise, and the comparator 342 outputs a signal to ensure the switch 343 is off and prevents the low frequency sensor signal from being output.

Figure 5A:
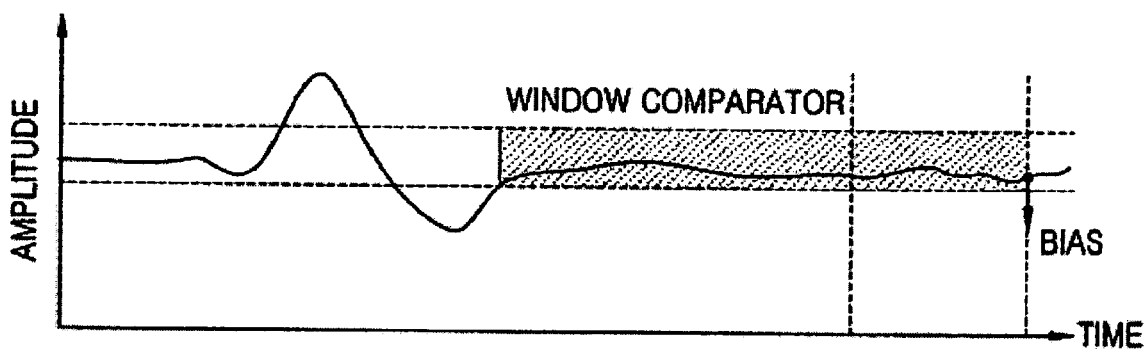
FIGS. 5A and 5B illustrate results when a conventional apparatus and the present invention for compensating for a bias are applied to a sensor signal, respectively.
Figure 5B:
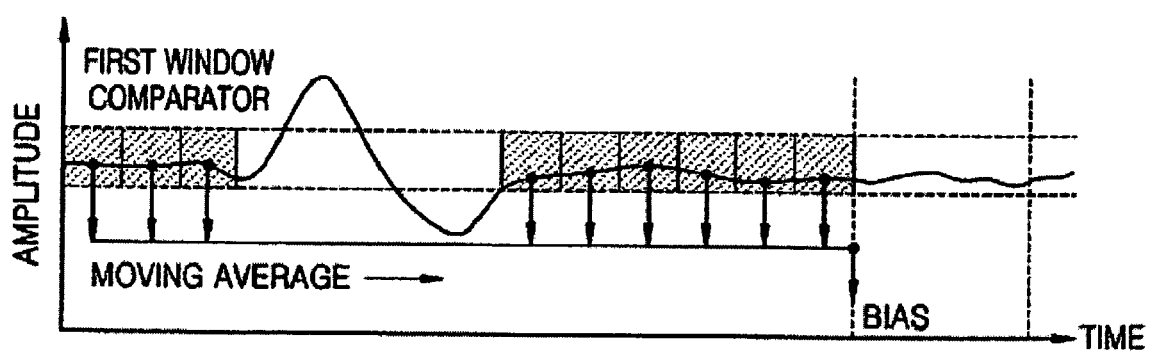

FIGS. 5A and 5B illustrate results when a conventional apparatus and the present invention for compensating for a bias are applied to a sensor signal, respectively. In the conventional apparatus, since only one window comparator is used, bias compensation is hardly performed if the amplitude of the differentiated sensor signal is larger than the width of the window. However, in the apparatus of the present invention, a smaller-sized window than that of the conventional apparatus is used, a moving average of the sensor signal is calculated for any portion except one that an amplitude of the differentiated sensor signal is larger than the window width. Then, the bias can be compensated by cumulatively averaging the calculated moving averages for a predetermined number of windows. Thus, bias can be compensated for faster and more accurately than with the conventional apparatus.

Figure 6A:
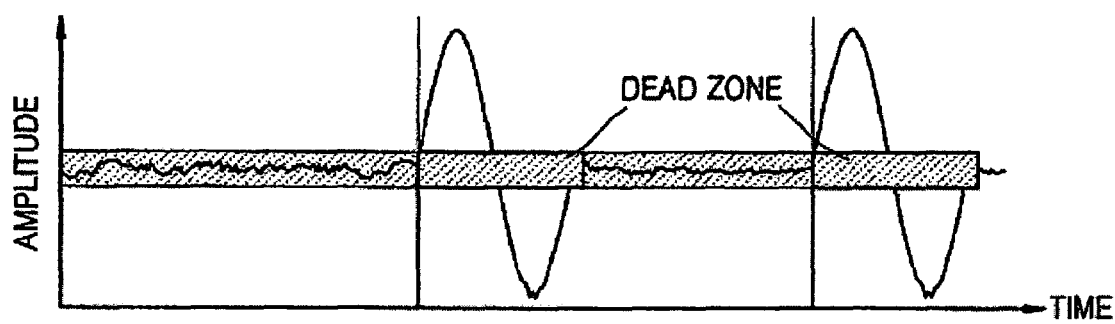
FIGS. 6A and 6B illustrate results when a conventional apparatus and the present invention for controlling tolerance are applied to a sensor signal, respectively.
Figure 6B:
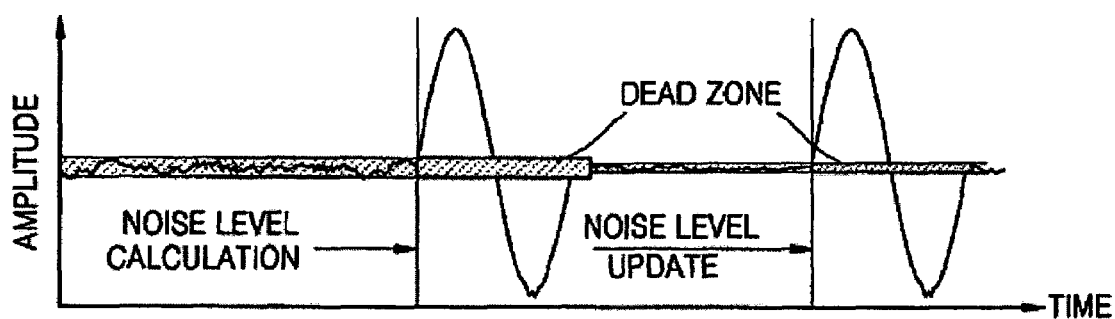

FIGS. 6A and 6B illustrate results when a conventional apparatus and the present invention for controlling tolerance are applied to a sensor signal, respectively. In the conventional tolerance controlling apparatus, a size of a dead zone indicating a width of the tolerance does not change, even if the noise level does change. However, in the apparatus of the present invention, a size of dead zone changes according to the noise level.

In the apparatus for compensating the bias of the present invention, the moving average of the sensor signal is calculated using a smaller window and a cumulative average of the moving average is calculated to compensate the bias, thus improving the reliability of bias value and reducing the time required for updating the bias.

Also, according to the apparatus for controlling tolerance level of the present invention, the size of dead zone is changed according to changes in the noise level, thus expanding the usable range of the sensor output, reducing possibility of mis-operation, and improving stability. Thus, the range of sensitivity of the sensor is increased, signal loss is prevented, and stability is improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for enhancing the accuracy of a sensor signal output from a sensor by estimating and compensating for bias, the apparatus comprising:
   a low-pass filter (LPF) operable to filter the sensor signal and output a low-frequency sensor signal;
   an operation determination unit operable to determine whether the sensor is not in operation;
   a bias estimating unit operable to estimate bias included in the low frequency sensor signal output from the LPF according to the output of the determination unit; and
   a subtractor operable to subtract the estimated bias from the low frequency sensor signal according to the output of the operation determination unit,
   wherein the sensor is determined to not be in operation when a differentiated low frequency sensor signal is smaller than a first sized window and the low frequency sensor signal is smaller than a second sized window.

2. An apparatus for enhancing the accuracy of a sensor signal output from a Sensor by estimating and compensating for bias, the apparatus comprising:
   a low-pass filter (LPF) operable to filter the sensor signal and output a low-frequency sensor signal;
   an operation determination unit operable to determine whether the sensor is not in operation;
   a bias estimating unit operable to estimate bias included in the low frequency sensor signal output from the LPF according to the output of the determination unit; and
   a subtractor operable to subtract the estimated bias from the low frequency sensor signal according to the output of the operation determination unit,
   wherein the determination unit comprises:
   a differentiator operable to differentiate the low frequency sensor signal;
   a first window comparator operable to determine whether or not the differentiated low frequency sensor signal is included in a window of a first size;
   a second window comparator operable to determine whether or not the low-frequency sensor signal is included in a window of a second size; and
   a multiplier operable to multiply outputs of the first and second window comparators.

3. The apparatus of claim 2, wherein the bias estimating unit comprises:
   a moving averager operable to move a window having a predetermined length along a time axis and output each average of the sensor signal corresponding to the window;
   a first storing unit operable to store the averages output from the moving averager and output the stored averages according to the output of the multiplier;
   a cumulative averager operable to accumulate a predetermined number of average output from the first storing unit, and averages the accumulated averages to output as a cumulative average; and
   a second storing unit operable to store the cumulative averages output from the cumulative averager and output the stored cumulative averages according to the output of the multiplier.

4. The apparatus of claim 3, wherein the window of the moving averager is the same length along a time axis as the window of the first window comparator.

5. An apparatus for enhancing the accuracy of a sensor signal output from a sensor by estimating and compensating for bias, the apparatus comprising:
   a low-pass filter (LPF) operable to filter the sensor signal and output a low-frequency sensor signal;
   an operation determination unit operable to determine whether the sensor is not in operation;
   a bias estimating unit operable to estimate bias included in the low frequency sensor signal output from the LPF according to the output of the determination unit; and
   a subtractor operable to subtract the estimated bias from the low frequency sensor signal according to the output of the operation determination unit, wherein the bias estimating unit comprises:
a moving averager operable to move a window having a predetermined length along a time axis and calculate each average of the sensor signal corresponding to the window;
a first storing unit operable to store the averages output from the moving averager and output the stored averages according to the output of the operation determination unit;
a cumulative averager operable to accumulate a predetermined number of average output from the first storing unit, and averages the accumulated averages to output as a cumulative average; and
a second storing unit operable to store the cumulative averages output from the cumulative averager and output the stored cumulative averages according to the output of the determination unit.

6. An apparatus for enhancing the accuracy of a sensor signal output from a sensor by controlling a tolerance level, the apparatus comprising:
a low-pass filter (LPF) operable to filter the sensor signal and output a low-frequency sensor signal;
a determination unit operable to determine whether the sensor is not in operation;
a noise bias estimating unit operable to estimate bias caused by noise which is included in the low frequency sensor signal output from the low-pass filter, according to the output of the determination unit;
a tolerance level estimating unit operable to detect a level of the low frequency sensor signal that is higher than the estimated bias, according to the output of the operation determination unit, and estimate a tolerance level based on the detected level and the estimated bias; and
a signal discriminating unit operable to output the low frequency sensor signal when the low frequency signal exceeds the estimated tolerance level.

7. The apparatus of claim 6, wherein the determination unit comprises:
a first window comparator operable to determine whether or not the low frequency sensor signal is included in a window of a first size;
a differentiator operable to differentiate the low frequency sensor signal;
a second window comparator operable to determine whether or not the differentiated low frequency sensor signal is included in a window of a second size; and
a multiplier operable to multiply outputs of the first and second window comparators.

8. The apparatus of claim 7, wherein the noise bias estimating unit comprises:
a moving averager operable to move a window having a predetermined length along a time axis and calculate each average of the sensor signal corresponding to the window;
a first storing unit operable to store the averages output from the moving averager and output the stored averages according to the output of the multiplier;
a cumulative avenger operable to accumulate a predetermined number of averages output from the first storing unit and average the accumulated averages to output as a cumulative average; and
a second storing unit operable to store the cumulative averages output from the cumulative averager and output the stored cumulative averages according to the output of the multiplier.

9. The apparatus of claim 8, wherein the window of the moving averager is the same length along a time axis as the window of the second window comparator.

10. The apparatus of claim 6, wherein the noise bias estimating unit comprises:
a moving averager operable to move a window having a predetermined length along a time axis and calculate each average of the sensor signal corresponding to the window;
a first storing unit operable to store the averages output from the moving averager and output the stored averages according to the output of the operation determination unit;
a cumulative averager operable to accumulate a predetermined number of average output from the first storing unit, and averages the accumulated averages to output as a cumulative average; and
a second storing unit operable to store the cumulative averages output from the cumulative averager and output the stored cumulative averages according to the output of the operation determination unit.

11. The apparatus of claim 6, wherein the tolerance level estimating unit comprises:
a level detector operable to detect and output a level of the low frequency sensor signal that is higher than the estimated noise bias, according to the output of the determination unit; and
an adder operable to add the level detected by the level detector, a predetermined bias, and the estimated noise bias, and output the result as the tolerance level.

12. The apparatus of claim 11, wherein the signal discriminating unit comprises:
a storing unit operable to store the estimated tolerance level and output the stored value according to the output of the operation determination unit;
a comparator operable to compare the low frequency sensor signal with a signal output from the storing unit and output the compared result; and
a switch operable to open or close depending on the output value of the comparator to either output or not output the low frequency sensor signal, respectively.

13. The apparatus of claim 6, wherein the signal discriminating unit comprises:
a storing unit operable to store the estimated tolerance level and output the stored value according to the output of the operation determination unit;
a comparator operable to compare the low frequency sensor signal with the signal output from the storing unit and output the compared result; and
a switch operable to open or close depending on the output value of the comparator to either output or not output the low frequency sensor signal, respectively.

14. A method for enhancing the accuracy of a sensor signal output from a sensor by estimating and compensating for a bias in the sensor signal, the method comprising:
(a) low-pass filtering the sensor signal and outputting a low frequency sensor signal;
(b) determining whether or not the sensor is not in operation;
(c) estimating the bias included in the low frequency sensor signal when it is determined in step (b) that the sensor is not operating; and
(d) compensating for the bias by subtracting the estimated bias from the low frequency sensor signal,
wherein the sensor is determined to not be in operation when a differentiated low frequency sensor signal is smaller than a first sized window and the low frequency sensor signal is smaller than a second sized window.

15. A method for enhancing the accuracy of a sensor signal output from a sensor by estimating and compensating for a bias in the sensor signal, the method comprising:
- (a) low-pass filtering the sensor signal and outputting a low frequency sensor signal;
- (b) determining whether or not the sensor is not in operation;
- (c) estimating the bias included in the low frequency sensor signal when it is determined in step (b) that the sensor is not operating; and
- (d) compensating for the bias by subtracting the estimated bias from the low frequency sensor signal, wherein step (c) comprises:
- (c1) moving a predetermined length window along a time axis, averaging the low frequency signal corresponding to the window and outputting each average when the sensor is not operating; and
- (c2) accumulating a predetermined number of averages output in step (c1), averaging the accumulated averages to output as the bias, when it is determined in step (b) that the sensor is not operating.

16. A method for enhancing the accuracy of a sensor signal output from a sensor by controlling a tolerance level, the method comprising;
- (a) low-pass filtering the sensor signal and outputting a low frequency sensor signal;
- (b) determining whether or not the sensor is not in operation;
- (c) estimating a bias due to noise included in the low frequency sensor signal when it is determined in step (b) that the sensor is not operating;
- (d) detecting a level of the low frequency sensor signal that is higher than the estimated noise bias, and estimating the tolerance level using the sensed level and the noise bias, when it is determined in step (b) that the sensor is not operating; and
- (e) outputting the low frequency sensor signal when the filtered sensor signal has a higher level than the tolerance level estimated in step (d).

17. The method of claim 16, wherein step (b) comprises:
- (b1) differentiating the low frequency sensor signal; and
- (b2) detennining that the sensor is not operating when an amplitude of the differentiated, low frequency sensor signal is a first value or less, and an amplitude of the low frequency sensor signal is a second value or less.

18. The method of claim 16, wherein step (c) comprises:
- (c1) moving a predetennined length window along a time axis, averaging the low frequency signal corresponding to the window and outputting each average value when the sensor is not operating; and
- (c2) accumulating a predetermined number of averages output in step (c1), averaging the accumulated averages to output as the bias, when it is determined in step (b) that the sensor is not operating.

19. The method of claim 16, wherein step (d) comprises:
- (d1) detecting a level of the low frequency sensor signal that is higher than a level of the noise bias estimated in step (c), when it is determined in step (b) that the sensor is not operating; and
- (d2) estimating the tolerance level by adding the detected level, an externally provided bias, and the estimated noise bias.

* * * * *